UNITED STATES PATENT OFFICE.

EDWARD C. BRICE, OF WASHINGTON, DISTRICT OF COLUMBIA.

COMPOSITION OF MATTER.

SPECIFICATION forming part of Letters Patent No. 555,205, dated February 25, 1896.

Application filed May 21, 1895. Serial No. 550,089. (No specimens.)

*To all whom it may concern:*

Be it known that I, EDWARD C. BRICE, a citizen of the United States, residing at Washington, District of Columbia, have invented certain new and useful Improvements in a Composition of Matter; and I do hereby declare the following to be a full, clear, and exact description of the invention, such as will enable others skilled in the art to which it appertains to make and use the same.

This invention relates to the manufacture of materials to be used in the construction of melting-pots, crucibles, cupels, furnace-lining, and furnace-fixtures, such as are now used in glassworks, smelting-furnaces, &c.

The object of my invention is to create and produce cheaply and expeditiously a fireproof material to be used in the manufacture of the following vessels: glass-pots, for use in the fusion of glass; crucibles, to be used in melting-furnaces; cupels of a large size, to be used in refining gold and silver; also furnace-fixtures of any kind.

The vessels which I produce are formed from the materials without being burned, which is now necessary in all vessels of the kind made from clay. At the same time I secure a vessel that will not crack or break when suddenly submitted to a red heat, which is now the case with vessels made from clay and burned.

My composition of matter is composed of the following ingredients in substantially the proportions stated, by weight: I take two parts of asbestos and eight parts of powdered silica or bone-ash, which are equivalents, for the purposes of this invention, and thoroughly mix the same together in a suitable vessel, where water is added in suitable proportions to make the mixed ingredients sufficiently moist to mold the same into shape. These forms or vessels are then placed into a suitable drying-kiln, where they are kept for twelve hours to be dried. When the molded forms or vessels have been allowed time to dry they are complete and ready for use as a finished product.

I have now explained my composition of matter used in the creation of these forms or vessels and the process employed by me in the production of the same, with full knowledge of the art in respect thereto.

I am made aware that it has been proposed to form a crucible-lining of a composition of asbestos and some other fireproof substance; but so far as I can learn it has been proposed in making this substance either to apply it as a lining or covering in a moist condition or else to first burn it. I have found that in the preparation of this material it is necessary that it should not be burned, but should simply be dried, for if the composition is applied in a moist state the heat will cause it to crack and separate by reason of the action of the heat upon the moisture. This is also true if an attempt be made to burn the material before it is put into use; also by simply drying the material instead of burning it the material may be cut and shaped even after molding, so as to adapt it to various uses and purposes.

I am also made aware that it has been proposed to unite asbestos and some other fireproof material by arranging them in alternate layers and subjecting them to pressure; but in carrying out my invention the asbestos and the fireproof material are thoroughly commingled, so that there is an intimate relation between the two.

I am also made aware that it has been proposed to make a composition for lining furnaces, which composition is to consist of pulverized asbestos, ground plumbago and ground clay. In the making of this composition it is proposed to mix the asbestos and plumbago separately and then the clay with water separately, the clay and water being mixed about the consistency of thick cream. The whole is then to be mixed together until the mass shall assume the consistency of plaster or mortar. This composition is set out in United States Patent No. 163,345.

In my composition, as has been already stated, the asbestos and the other fireproof material are only mixed with enough water to sufficiently moisten them so that they may be molded. As they are to be molded, it is desirable that they shall be of such consistency that when removed from the mold they will hold the shape given them.

Having described my invention, what I claim is—

As a new article of manufacture, an unburned but dried substance consisting of two parts of asbestos and eight parts of silica, as set forth.

In testimony whereof I hereto affix my signature in presence of two witnesses.

EDWARD C. BRICE.

Witnesses:
THOS. S. HOPKINS,
EDMUND R. COCKE.